April 23, 1929.   T. H. BAUER   1,710,039
WEEDING TOOL
Filed July 31, 1926
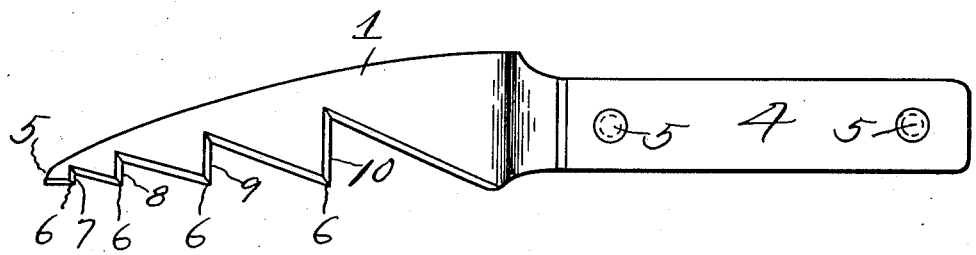
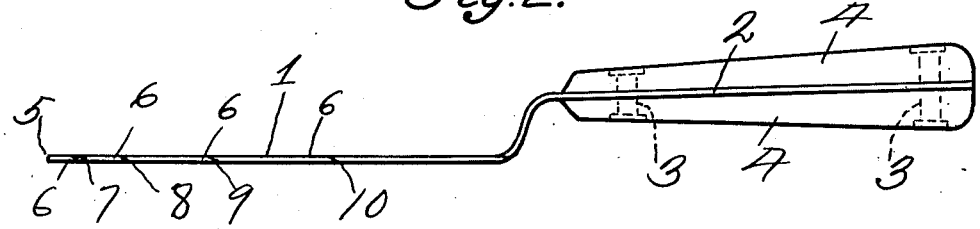
INVENTOR.
Theodore H. Bauer.
BY George J. Oltsch
ATTORNEY.

Patented Apr. 23, 1929.

1,710,039

UNITED STATES PATENT OFFICE.

THEODORE H. BAUER, OF WARREN TOWNSHIP, ST. JOSEPH COUNTY, INDIANA.

WEEDING TOOL.

Application filed July 31, 1926. Serial No. 126,272.

The invention relates to a weeding and plant thinning tool, which tool is in the general form of a knife and comprises a handle member having a blade, and which blade tapers in width to its outer end, and has one side thereof provided with cutting edges at substantially a right angle to the axis of the handle, and which cutting edges are adapted to be placed in engagement with the stalk of a weed or plant during a weeding or thinning operation for severing the same upon a pull on the tool transversely in relation to the row. The cutting edges increase in length from the point of the blade inwardly and are selectively used according to the distance the plants are from each other, thereby allowing a thinning operation where the plants are relatively close to each other.

A further object is to provide outwardly inclined cutting edges starting from the inner ends of the tranversely disposed cutting edges, and which outwardly inclined cutting edges may be utilized for cutting stalks of weeds or plants by imparting a push on the tool, or for general pruning purposes for instance on berry bushes or small fruit trees.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a plan view of the weeding knife.

Figure 2 is a side elevation of the weeding knife.

Referring to the drawing, the numeral 1 designates the blade of the knife, which blade is provided with an offset portion 2 in parallel relation thereto, and which portion 2 is securely clamped by means of rivets 3 between the members 4 which form the handle of the knife, and which handle is grasped by the operator while using the knife.

Blade 1 tapers in width to substantially a vanishing point at its outer end 5 and is provided with a plurality of teeth 6 at one side thereof, and which teeth are provided with transversely disposed cutting edges 7, 8, 9, and 10, which cutting edges are of different lengths and increase in length from the point 5 of the knife inwardly, however the teeth 6 extend outwardly to a position where their outer ends are in alinement as clearly shown in Figure 1. It has been found with weeding tools as at present constructed make no provision for weeding plants at various distances apart, especially where the plants are relatively close, and it is desired only to insert a very small instrument to a position for cutting the stalk thereof, consequently with devices at present constructed, close thinning of plants is practically impossible. To obviate this difficulty, applicant's blade 1 as shown in Figure 1 tapers to a sharp point 5, and where the plants are relatively close the point of the blade is relatively narrow, for instance adjacent the cutting edge 7, therefore it will be seen by using the knife in a transverse relation to the row of plants, the cutting edge 7 may be placed behind the stalk of the plant to be cut and the stalk easily severed by imparting a pull on the tool. As the distances of plants vary incident to the method of planting, the operator can select any of the transversely disposed cutting edges 7, 8, 9 or 10 according to the distance of the plants from each other, or the size of the stalks thereof, therefore it will be seen that a knife is provided which will accommodate itself for use in thinning plants of different distances from each other and for stalks of different diameters. The knife may be used for other general purposes, for instance as a pruning device for pruning small fruit trees and berry bushes, however it is particularly adapted for use as a weeding or plant thinning knife. It has been found that the knife is particularly adapted for use on truck and fruit farms where the labor item must be kept to a minimum to make truck farming profitable.

From the above it will be seen that a weeding knife is provided which may be worked transversely in relation to a row of plants, and where the plants are relatively close the knife, by being constructed with a tapered blade may only be inserted the desired distance between the plants thereby preventing damage to adjacent plants during the cutting operation.

The invention having been set forth what is claimed as new and useful is:—

A weeding knife comprising a handle member, a pointed blade carried by said handle member, said blade being offset in a plane parallel to the axis of the handle and to one side thereof, one side of said blade being provided with a plurality of sharpened teeth, the inner sides of said teeth having their sharpened edges transversely disposed, the outer ends of said teeth being substantially in alinement with each other and with one side of the handle, said teeth increasing in size from adjacent the blade point to the inner end thereof, thereby forming recesses of varying depths from the blade point to the handle.

In testimony whereof I affix my signature.

THEODORE H. BAUER.